April 10, 1934.  E. BERNITZ, SR  1,953,947
MEANS AND METHOD FOR PROTECTING TREES FROM INSECTS
Filed Feb. 28, 1933  2 Sheets-Sheet 1
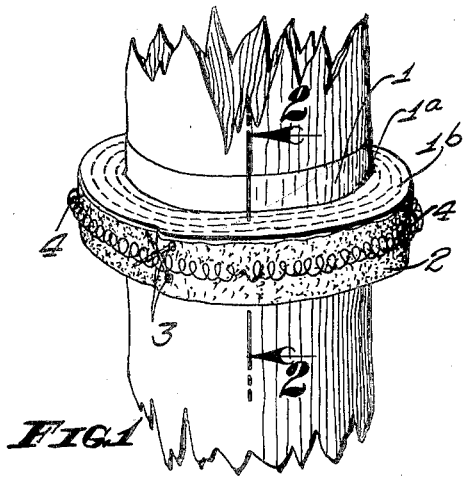
FIG.1
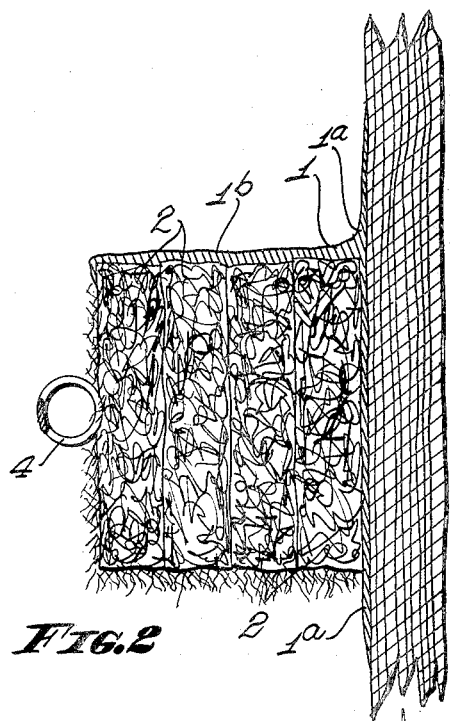
FIG.2
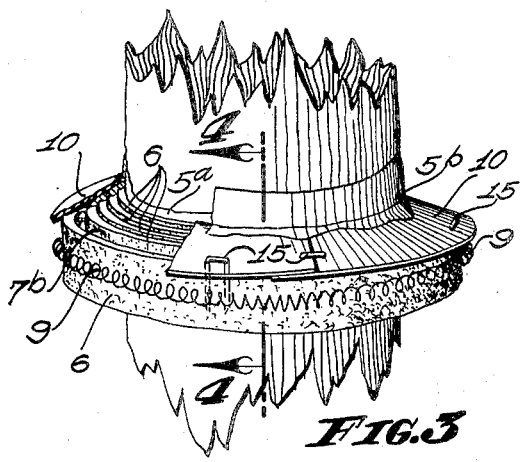
FIG.3
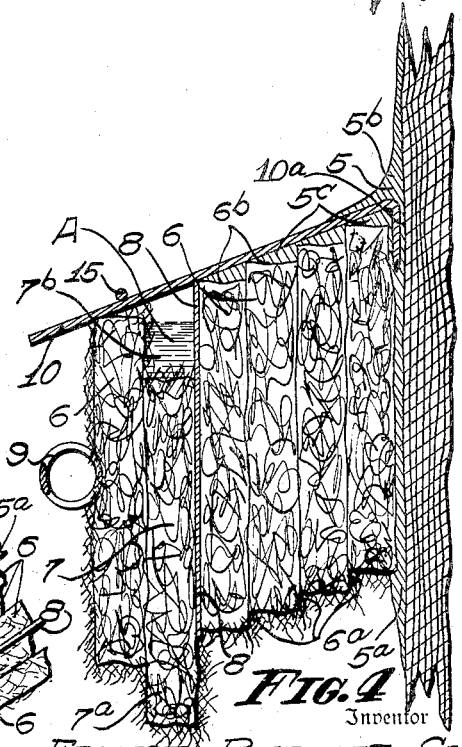
FIG.4
FIG.5
Inventor
ERNEST BERNITZ SR
By A. B. Bowman
Attorney

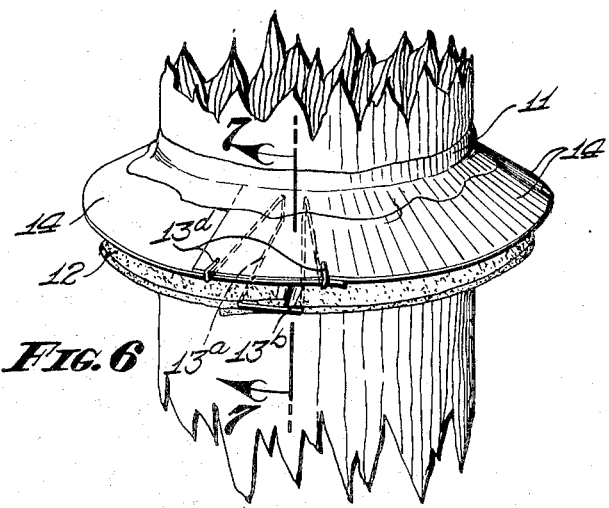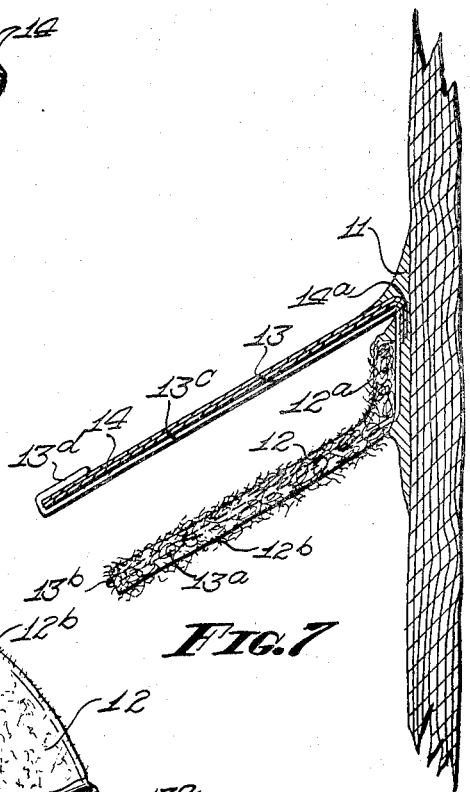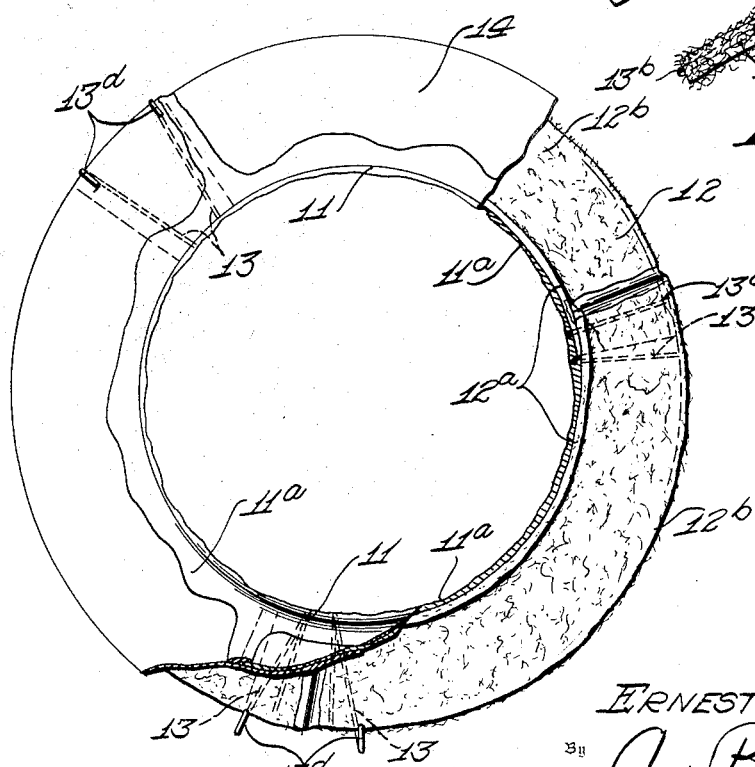

Patented Apr. 10, 1934

1,953,947

UNITED STATES PATENT OFFICE 1,953,947

MEANS AND METHOD FOR PROTECTING TREES FROM INSECTS

Ernest Bernitz, Sr., La Mesa, Calif.

Application February 28, 1933, Serial No. 658,884

19 Claims. (Cl. 47—24)

My invention relates to means and methods of protecting trees from insects, and the objects of my invention are:

First, to provide a means of this class which girdles the trunk of the tree and forms a mechanical barrier against crawling insects;

Second, to provide a means of this class which expands as the tree grows so that it may remain about the tree for long periods without injury thereto;

Third, to provide a means of this class which does not deteriorate but maintains its effectiveness for long periods;

Fourth, to provide a means of this class which provides a surface over which insects, whether minute or relatively large, avoid traversing, the surface forming virtually a labyrinth which confuses or entangles the insect, and having straggling wisp or hair like extensions which afford insecure footing causing the insects quickly to lose their hold;

Fifth, to provide a means of this class in which the most effective guarding surface is on the under side so that the insects fall therefrom, and at the same time the guarding surface is protected from the weather as well as the collection of deleterious matter which might otherwise form a bridge for the insects;

Sixth, to provide a means of this class which under ordinary conditions does not require use of any type of chemical insect deterrent or poison, and thereby maintains its usefulness long after the poison or like has evaporated or otherwise become ineffective;

Seventh, to provide a means of this class which may if desired incorporate a poison or insect deterrent saturated ring about the tree which is spaced from the tree to prevent detrimental effect thereto, and which incorporates a reservoir so that the poison or the like may be replenished from time to time;

Eighth, to provide a method of protecting trees from insects whereby a mechanical as well as a chemical barrier is formed;

Ninth, to provide a means and method of protecting trees from insects which is particularly simple of manufacture and of application; and Tenth, to provide on the whole a novelly arranged means of protecting trees from insects which is durable, efficient and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a fragmentary perspective view of a tree trunk with my means in its simpler form shown in position, Figure 2 is a large fragmentary sectional view thereof through 2—2 of Figure 1, Figure 3 is a perspective view similar to Fig. 1 of a modified form of my tree protecting means, Figure 4 is a large fragmentary sectional view thereof through 4—4 of Figure 3, Figure 5 is a fragmentary plan view thereof, Figure 6 is a perspective view similar to Figures 1 and 3 of a third form of my tree protecting means, Figure 7 is a sectional view thereof through 7—7 of Figure 6, and Figure 8 is a plan view thereof with parts and portions broken away in section to facilitate the illustration.

Sealing material 1, guard wrapping 2, securing pins 3 and yieldable retainer 4 constitute the principal parts and portions of my simpler form of means for protecting trees from insects. Sealing material 5, guard wrapping 6, saturated circumvolution 7, sealing strip 8, yieldable retainer 9, roof 10, and staples 15, constitute the principal parts and portions of a modified form of my means. Sealing material 11, guard segments 12, supporting brackets 13, and roof segments 14 constitute the principal parts and portions of a second modified form of my means.

The simpler embodiment of my invention utilizes a quantity of sealing material 1 which is applied in the from of a ring or band 1a about the trunk of the tree. The material may be asphaltum or other material which maintains a somewhat fluid condition so as to yield as the tree expands, and also to fill in the cracks and crevices of the bark, the material preferably being applied in a liquid state and hardening to a semi-liquid condition upon exposure.

A relatively long strip hair felt is provided which forms the guard wrapping 2. The wrapping is applied about the band coating 1a of the sealing material and forms several convolutions. The sealing material forms a seal between the wrapping and the trunk. The guard wrapping strip is relatively thick so that a few convolutions of the wrapping form a ridge or flange extending outwardly from the tree trunk for several inches. The extremities of the wrapping may be held in place by pins 3, ordinary nails being suitable for this purpose. Around this guard wrapping is applied a yieldable retainer 4 in the form of a coil spring.

The sealing material 1 is applied over the top of the guard wrapping so as to form a roof or cover 1b therefor; thus the water which flows down the trunk of the tree is diverted to the outer side of the guard wrapping.

I have found that hair felt has several features that makes it uniquely suitable for the protection of trees from insects. In the first place this material is very durable and will not rot when exposed to the weather; secondly, the material is, under ordinary conditions, impervious to water, it being necessary to work or scrub the water into hair felt before it absorbs water; third, the surface of hair felt forms virtually a labyrinth through or over which it is impossible for an insect to pass. Ends of the hair, some of which are quite fine, project outwardly from the normal surface of the hair felt. The insect after attempting to force its way through or along the surface of the felt, climbs the various protruding hairs and its foothold becomes precarious. After a few such attempts, the insect is sure to fall, particularly when crawling along the under side of the felt; thus, an insect in order to climb a tree trunk equipped with the sealing means must pass along the under side of the guard wrapping and soon falls off. This is found to be true of the most minute insect as well as the larger ones. By reason of the fact that the most effective surface of the wrapping is at its under side and is therefore sheltered, the wrapping remains effective for a long period of time.

In the above described structure, the guard wrapping extends with its upper and lower sides substantially horizontally. Then effectiveness of the wrapping may be increased somewhat by offsetting the several convolutions, particularly by offsetting the outer convolutions downward. The structure embodied in Figures 3, 4, and 5 illustrate such application of my means for protecting trees. As in the first described structure, a band coating 5a of sealing material 5 is applied around the trunk of the tree. Around this is applied several convolutions of guard wrapping 6 formed of hair felt or the like similar to the guard wrapping 2. In this case, however, the several convolutions are offset downwardly so as to form ledges 6a at the under side of the rim or flange formed by the guard wrapping. The upper side designated 6b of the guard wrapping has a general downward and outward slope.

One of the convolutions preferably near the outer end of the guard wrapping is saturated with a substance which is obnoxious or poisonous to insects. This convolution, designated 7, is preferably offset downwardly a greater extent than the convolutions on either side thereof so as to form a downwardly directed annular rib 7a. The upper end of the saturated convolution 7 forms with the exposed walls of the adjacent convolutions an annular reservoir channel 7b. This channel is filled with suitable insect deterrent or poison, designated A in Figure 4, such as used to saturate the convolution 7. In as much as this type of substance is usually detrimental to the tree itself, contact of the substance with the tree may be entirely prevented by inserting a thin impervious sealing strip 8 between the saturated convolution 7 and the adjacent inner convolution. However, hair felt does not readily absorb; hence, if the saturated convolution is placed outwardly a few inches from the tree, the nature of the hair felt itself effectively insulates the substance designed for the insect away from the tree trunk. By reason of this fact that hair felt is not readily absorbent, the saturated convolution 7 may be formed of different, more absorbent material.

The guard wrapping is held in place by a yieldable retainer 9 in the form of a coil spring.

The upper side of the guard wrapping is covered by a guard roof 10 which rests against the wrapping and therefore slopes downwardly towards its outer periphery. The inner periphery of the roof is provided with a downwardly extending flange 10a which may be forced between the upper portion of the inner convolution and the coating 5a. The juncture between the roof and the band coating 5a is filled in with additional sealing material as indicated by 5b. Thus the water flows down the trunk and over the roof 10. Additional sealing material is preferably applied between the roof 10 and the upper side of the guard wrapping as indicated by 5c; such application of sealing material terminating at the saturated convolution 7. Beyond this the roof 10 is free so that the marginal portions may be raised and additional deterrent or poison may be poured into the channel 7b. Suitable staples 15 may be used to fasten the marginal portions of the roof in place.

With reference now to the structure illustrated in Figures 6, 7, and 8 which constitutes the third embodiment of my means for protecting trees; as in the first described structure, a band 11a of sealing material 11 is applied around the tree trunk. Several segmental guard members 12 are formed of hair felt material such as that forming the guard wrapping 2 and 6. Each guard segment comprises a segmental axially extending rim portion 12a and an outwardly and downwardly directed semi-conical portion 12b. The several segmental guard members are applied around the tree with their extremities over-lapping so as to form a continuous ring with the rim portions 12a in sealed relation with the sealing band 11a.

The outwardly projecting portions of the guard segment are held at such outwardly extended positions as well as in inter-relation by means of supporting brackets 13. These brackets are formed of wire, bent U-shaped at their central portion and forming spaced apart legs 13a connected at their one end by a cross portion 13b. The legs 13a extend substantially radially along the plane and through the semi-conical portions 12b protruding therefrom at their junctures with the rim portions 12a. Here the legs 13b curve upwardly and are imbedded in the sealing material 11 until they project above the rim portions 12a. Here the leg portions are bent downward again and extend outwardly from the tree trunk forming supporting bars 13c mounted above and in spaced relation to the semi-conical portions 12b of the guard segment. Positioned around the tree trunk and supported upon the rods 13c are roof segments 14; the radially inner extremities 14a of which are embedded in the sealing material 11, and the outer extremities of which are held by hook portions 13d as the extremities of the rods 13c.

Insects in order to progress along the trunk of the tree must pass downwardly along the under side of the guard segment, and in so doing, by reason of the nature of the hair felt of which these segments are composed, either become hopelessly entangled therein or fall therefrom.

In summation, my method of protecting trees consists in the following steps: First, a band of sealing material is applied around the trunk of a tree. This material is of such a nature that it can be applied while in the liquid state and under ordinary temperatures only hardens to a semi-liquid state so as to expand with the growth of the tree. Asphaltum and analogous substances have been found suitable. Second, a wrapping is wound around the freshly applied sealing material. The wrapping is a length of hair felt or other material forming a mechanical barrier or labyrinth. Included in the wrapping is a ring of material saturated with insect deterrent or poison.

Though I have shown and described certain constructions, combinations and arrangements of parts and portions and a certain method applicable thereto, I do not wish to be limited to the specified constructions, combinations and arrangements, nor to the method set forth, but desire to include in the scope of my invention the constructions, combinations, arrangements, and methods set forth in the appended claims.

Having thus described my invention what I claim as new and desire to secure by Letters Patent is:

1. In a means for protecting trees from insects, a labyrinth forming means adapted to girdle the trunk of a tree and projecting outwardly therefrom, and sealing means between said labyrinth means and the tree trunk adapted to divert insects over said labyrinth means.

2. In a means for protecting trees from insects, a girdle applied around the trunk of a tree, the surfaces of said girdle constituting a labyrinth and provided with delicate straggling portions affording insecure footing for insects, and sealing means between said girdle and the tree trunk whereby insects are forced to proceed along the surface of said girdle.

3. In a means for protecting trees from insects, a girdle applied around the trunk of a tree, forming an outwardly directed flange, the under side thereof constituting a labyrinth and provided with delicate straggling portions affording insecure footing for insects, and a sealing means between said girdle and the tree trunk whereby insects are forced to traverse the underside of said girdle.

4. In a means for protecting trees from insects, a yieldable girdle applied around the trunk of a tree, the surfaces of said girdle constituting a labyrinth and provided with delicate straggling portions extending outwardly from its surface affording insecure footing for insects, a semi-fluid sealing means between said girdle and the tree trunk whereby insects are forced to proceed along the surface of said girdle, and yieldable means for retaining said girdle in position whereby the tree is free to expand.

5. In a means for protecting trees from insects, a yieldable girdle applied around the trunk of a tree, the under surface of said girdle constituting a labyrinth and provided with delicate straggling portions extending downwardly from its under surface forming insecure blind paths whereby insects are caused to fall from said girdle, a semi-fluid sealing means between said girdle and the tree trunk whereby insects are forced to proceed along the surface of said girdle, and yieldable means for retaining said girdle in position whereby the tree is free to expand.

6. In a means for protecting trees from insects, a girdle applied around the trunk of a tree, forming an outwardly directed flange, the under side thereof constituting a labyrinth and provided with delicate straggling portions affording insecure footing for insects, a sealing means between said girdle and the tree trunk whereby insects are forced to traverse the under side of said girdle, and a substantially water tight roof means covering the upper side of said girdle.

7. In a means for protecting trees from insects, a yieldable girdle applied around the trunk of a tree, the under surface of said girdle constituting a labyrinth and provided with delicate straggling portions extending downwardly from its under surface forming insecure blind paths whereby insects are caused to fall from said girdle, a semi-fluid sealing means between said girdle and the tree trunk whereby insects are forced to proceed along the surface of said girdle, yieldable means for retaining said girdle in position whereby the tree is free to expand, and a substantially water tight roof means covering the upper side of said girdle.

8. In a means for protecting trees from insects, a strip of hair felt wrapped about the trunk of the tree for several convolutions forming a substantial outwardly directed flange, and sealing means between said wrapping of hair felt and the tree trunk for diverting insects from the tree trunk onto the surface of hair felt.

9. In a means for protecting trees from insects, a strip of hair felt wrapped about the trunk of the tree for several convolutions forming a substantial outwardly directed flange, sealing means between said wrapping of hair felt and the tree trunk for diverting insects from the tree trunk onto the surface of hair felt, and a roof means positioned over said wrapping of hair felt.

10. In a means for protecting trees from insects, a girdle in the form of a strip wound about the trunk of a tree, the convolutions offset downwardly from their adjacent inner convolutions whereby the upper and lower surfaces of the girdle extend generally downwardly and outwardly, the surfaces of said girdle constituting a labyrinth and provided with delicate straggling portions extending outwardly from its surface affording insecure footing for insects, and a semi-fluid sealing means between said girdle and the tree trunk whereby insects are forced to proceed along the surface of said girdle.

11. In a means for protecting trees from insects, a girdle in the form of a strip wound about the trunk of a tree, the convolutions offset downwardly from their adjacent inner convolutions whereby the upper and lower surfaces of the girdle extend generally downwardly and outwardly, the under surface of said girdle composed of the raw edge of said strip, and forming a labyrinth including straggling wisp like portions affording insecure footing for insects, and sealing means between said girdle and tree trunk for diverting insects from the tree trunk onto the under surface of said girdle.

12. In a means for protecting trees from insects, a girdle in the form of a relatively thick strip wound about the trunk of a tree to form several convolutions, including a convolution offset downwardly from the others forming a depending ring at the under side of the girdle, and a channel at the upper side of the girdle, said offset convolution adapted to be saturated with an insect deterrent and said channel forming a supply reservoir therefor, and sealing means between said girdle and tree trunk.

13. In a means for protecting trees from insects, a girdle in the form of a relatively thick strip wound about the trunk of a tree to form several convolutions, including a convolution offset downwardly from the others forming a depending ring at the under side of the girdle and a channel at the upper side of the girdle, said offset convolution adapted to be saturated with an insect deterrent and said channel forming a supply reservoir therefor, the under surface of said girdle composed of the raw edge of said strip, and forming a labyrinth including straggling wisp like portions affording insecure footing for insects, and sealing means between said girdle and tree trunk for diverting insects from the tree trunk onto the under surface of said girdle.

14. In a means for protecting trees from insects, a girdle in the form of a strip wound about the trunk of a tree, the convolutions offset downwardly from their adjacent inner convolutions whereby the upper and lower surfaces of the girdle extend generally downwardly and outwardly, one of said convolutions offset downwardly a greater extent than the others forming at the under side of said girdle a depending ring and at the upper side thereof an annular channel said convolution adapted to be saturated with an insect deterrent and said channel forming a supply reservoir therefor, and sealing means between said girdle and tree trunk.

15. In a means for protecting trees from insects, a girdle in the form of a strip wound about the trunk of a tree, the convolutions offset downwardy from their adjacent inner convolutions whereby the upper and lower surfaces of the girdle extend generally downwardly and outwardly, one of said convolutions offset downwardly a greater extent than the others forming at the under side of said girdle a depending ring and at the upper side thereof an annular channel, said convolution adapted to be saturated with an insect deterrent, and said channel forming a supply reservoir therefor, and sealing means between said girdle and tree trunk, and a frusto-conical roof positioned over and contiguous to said girdle and covering said channel.

16. In a means for protecting trees from insects, a frusto-conical labyrinth surfaced girdle comprising a plurality of segments adapted to encircle a tree trunk, a similarly formed roof, bracket means supporting said girdle and roof in spaced relation, and sealing and securing means attaching said roof and girdle to the tree trunk in sealed relation therewith.

17. A method of protecting trees consisting in, coating a tree trunk with a band of sealing material, and then applying a labyrinth surfaced girdle about said sealing material.

18. A method of protecting trees from crawling insects consisting in, applying a labyrinth barrier around the trunk of the tree, then applying an insect deterrent saturated band about said labyrinth barrier, and then applying a covering band about said saturated band.

19. In a means for protecting trees from insects, a frusto-conical girdle supported from and around a tree trunk, a frusto-conical roof supported thereabove, the surface of said girdle constituting a labyrinth and provided with delicate straggling wisp like extensions affording insecure footing for insects, and sealing means between said girdle and roof and tree trunk.

ERNEST BERNITZ, Sr.